(12) United States Patent
Shi et al.

(10) Patent No.: US 12,312,174 B1
(45) Date of Patent: May 27, 2025

(54) ROBOTIC PURCHASE ORDER FULFILLMENT SYSTEM

(71) Applicant: Amazon Technologies, Inc., Seattle, WA (US)

(72) Inventors: Jane Shi, Tewksbury, MA (US); Fan Wang, Woburn, MA (US)

(73) Assignee: Amazon Technologies, Inc., Seattle, WA (US)

( * ) Notice: Subject to any disclaimer, the term of this patent is extended or adjusted under 35 U.S.C. 154(b) by 768 days.

(21) Appl. No.: 17/527,940

(22) Filed: Nov. 16, 2021

(51) Int. Cl.
*B65G 1/137* (2006.01)
*B25J 9/16* (2006.01)
*G06Q 10/0631* (2023.01)
*G06Q 10/087* (2023.01)

(52) U.S. Cl.
CPC .......... *B65G 1/1373* (2013.01); *B25J 9/1638* (2013.01); *B25J 9/1682* (2013.01); *G06Q 10/063114* (2013.01); *G06Q 10/06315* (2013.01); *G06Q 10/087* (2013.01)

(58) Field of Classification Search
CPC ..... B65G 1/1373; B25J 9/1638; B25J 9/1682; G06Q 10/063114; G06Q 10/06315; G06Q 10/087
See application file for complete search history.

(56) References Cited

U.S. PATENT DOCUMENTS

| 8,326,679 B1 * | 12/2012 | Rowe | G06Q 10/08 |
| | | | 705/28 |
| 2022/0135347 A1 * | 5/2022 | Cohen | B25J 9/1687 |
| | | | 700/245 |

FOREIGN PATENT DOCUMENTS

| JP | 2023522087 | * | 5/2023 | |
| WO | WO-2016130849 A1 | * | 8/2016 | ........... B65G 1/1373 |
| WO | WO-2019103894 A1 | * | 5/2019 | ........... B65G 1/1373 |

* cited by examiner

*Primary Examiner* — Jacob S. Scott
*Assistant Examiner* — Erin Morris
(74) *Attorney, Agent, or Firm* — Eversheds Sutherland (US) LLP

(57) ABSTRACT

A computing system assigns items in a received purchase order to containers and coordinates movement of a first set of robots holding the containers and movement of a second set of robots holding the items to a set of stations that include robotic arms. The computing system also uses the robotic arms to place the items into the containers.

16 Claims, 9 Drawing Sheets

ROBOTIC PURCHASE ORDER FULFILLMENT SYSTEM

BACKGROUND

The present invention relates to purchase order fulfillment (e.g., grocery order fulfillment), and more specifically, to a robotic purchase order fulfillment system. A store (e.g., a grocery store) may implement an order fulfillment operation to provide convenience for the store's customers. A store employee fulfills a customer's purchase order by walking through different sections of the store and selecting the items that the customer identified in the purchase order. The employee places the items into one or more containers (e.g., bags) and then the bags are arranged for pickup or delivery to the customer.

The order fulfillment operation, however, is inefficient and slow. The store employee may have difficulty locating certain items within the store, which results in the employee repeatedly walking through the same areas of the store in search of those items, which slows down the fulfillment process. Additionally, the employee may not know the optimal path through the store to locate the customer's desired items. Consequently, the employee may walk redundantly and inefficiently through the store to locate the desired items, which slows down the fulfillment process.

DETAILED DESCRIPTION

This disclosure describes a robotic purchase order fulfillment system that uses robots to pack containers (e.g., bags) with a customer's desired items (e.g., grocery items). The system includes a set of robots that hold items, a set of robots that hold containers, and stations that have robotic arms. When a customer sends a purchase order to the system, the system coordinates the movement of the first set of robots and the second set of robots between the stations. For example, the system may determine the items to be packed into a container and then move the robots holding those items and the robot holding the container to a station. The robotic arm at that station then moves the items into the container. When the system determines that the container is full or that no further items should be placed in the container, the container is closed. The system starts packing another container if there are items remaining in the purchase order. After the items in the purchase have been moved into containers, the robots holding those containers move the containers to a staging area where the containers are arranged for pickup or delivery. As a result, the robotic purchase order fulfillment system efficiently and quickly fulfills purchase orders.

Figure 1:
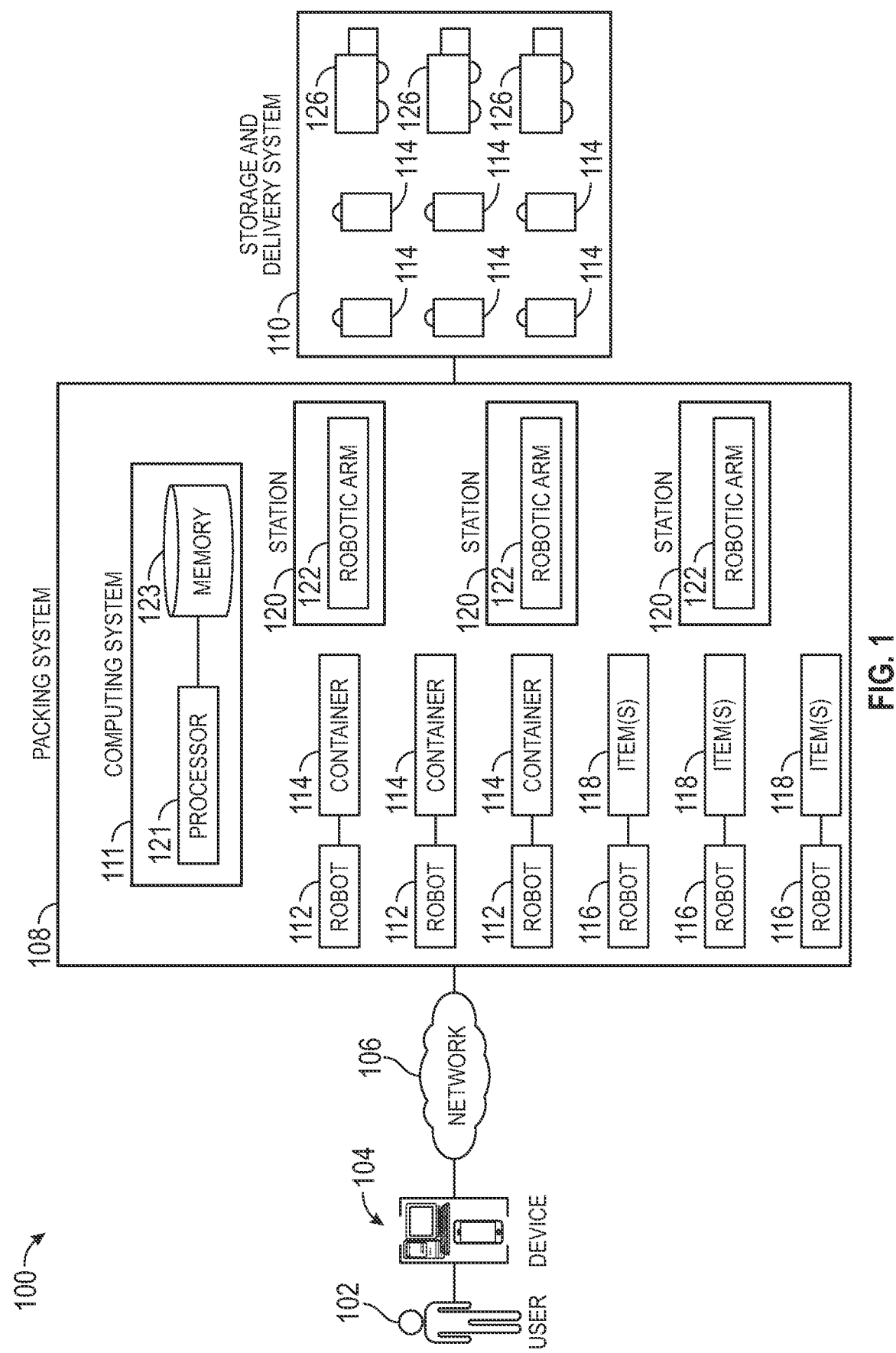
FIG. 1 illustrates an example system.

FIG. 1 illustrates an example system 100. As seen in FIG. 1, the system 100 includes one or more devices 104, a network 106, a packing system 108, and a storage and delivery system 110. The packing system 108 uses robots to fulfill purchase orders (e.g., grocery orders) received from the device 104. To fulfill a purchase order, the packing system 108 coordinates the movement and actions of the robots to place items into containers. After the purchase order has been fulfilled, the packing system 108 moves the containers that hold the items to the storage and delivery system 110. The containers are then arranged for pickup or delivery. In certain embodiments, by coordinating the movement and actions of the robots to fulfill purchase orders, the system 100 improves the efficiency of the fulfillment process, and reduces the time that it takes to fulfill purchase orders.

A user 102 uses the device 104 to generate and communicate purchase orders to the packing system 108. For example, the user 102 may use the device 104 to create a grocery order that contains a list of grocery items that the user 102 desires. The device 104 communicates the grocery order to the packing system 108 so that the packing system 108 can fulfill the grocery order. After the packing system 108 fulfills the grocery order, the user 102 picks up the grocery order from the storage and delivery system 110 or the grocery order may be delivered to the user 102.

The device 104 is any suitable device for communicating with components of the system 100 over the network 106. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may be a wearable device such as a virtual reality or augmented reality headset, a smart watch, or smart glasses. The device 104 may also include a user interface, such as a display, a microphone, keypad, or other appropriate terminal equipment usable by the user 102. The device 104 may include a hardware processor, memory, or circuitry configured to perform any of the functions or actions of the device 104 described herein. For example, a software application designed using software code may be stored in the memory and executed by the processor to perform the functions of the device 104.

The network 106 is any suitable network operable to facilitate communication between the components of the system 100. The network 106 may include any interconnecting system capable of transmitting audio, video, signals, data, messages, or any combination of the preceding. The network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The packing system 108 uses robots to fulfill purchase orders received from the device 104. As seen in FIG. 1, the packing system 108 includes a computing system 111, robots 112 holding containers 114, robots 116 holding items 118, and stations 120 that include robotic arms 122. In particular embodiments, the packing system 108 improves the efficiency of the purchase order fulfillment process and reduces the amount of time it takes to fulfill a purchase order.

The computing system 111 controls the operation of the packing system 108. For example, the computing system 111 analyzes purchase orders and coordinates the movement and operation of the robots 112, the robots 116, and the robotic arms 122 to fulfill the purchase orders. The computing system 111 may coordinate the movement and actions of these components according to any number of suitable factors to reduce the amount of time it takes to fulfill the purchase orders. For example, the computing system 111 may receive a purchase order and determine which items 118 should be placed into which containers 114 to fulfill the purchase order. The computing system 111 issues instructions to the robots 112 and the robots 116 to move the robots 112 and 116 to particular stations 120 so that the containers 114 and items 118 held by the robots 112 and 116 are within range of the robotic arms 122. The computing system 111 then issues instructions to the robotic arms 122 so that the robotic arms 122 pick up and place the items 118 into the containers 114. The computing system 111 may consider the weight, frangibility, and volume of the items 118 to determine an order in which the items 118 should be placed into the containers 114. When the computing system 111 determines that a container 114 is full or that no further items 118 should be placed into the container 114, the computing system 111 issues an instruction to the robot 112 holding the container 114 to move to the storage and delivery system 110 so that the container 114 may be prepared for pickup or delivery. As seen in FIG. 1, the computing system 111 includes a processor 121 and a memory 123, which perform the functions and actions of the computing system 111.

The processor 121 is any electronic circuitry, including, but not limited to one or a combination of microprocessors, microcontrollers, application specific integrated circuits (ASIC), application specific instruction set processor (ASIP), and/or state machines, that communicatively couples to memory 123 and controls the operation of the computing system 111. The processor 121 may be 8-bit, 16-bit, 32-bit, 64-bit or of any other suitable architecture. The processor 121 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 121 may include other hardware that operates software to control and process information. The processor 121 executes software stored on the memory 123 to perform any of the functions described herein. The processor 121 controls the operation and administration of the computing system 111 by processing information (e.g., information received from the devices 104, network 106, and memory 123). The processor 121 is not limited to a single processing device and may encompass multiple processing devices.

The memory 123 may store, either permanently or temporarily, data, operational software, or other information for the processor 121. The memory 123 may include any one or a combination of volatile or non-volatile local or remote devices suitable for storing information. For example, the memory 123 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 123, a disk, a CD, or a flash drive. In particular embodiments, the software may include an application executable by the processor 121 to perform one or more of the functions described herein.

The robots 112 carry the containers 114 (e.g., boxes or bags) around the packing system 108 based on instructions from the computing system 111. The robots 112 may include any suitable mechanism for holding containers 114. For example, the robots 112 may resemble a moving platform that hold the containers 114, and the containers 114 may rest on the platforms. The robots 112 move between the stations 120 to move the containers 114 to the different stations 120. As another example, the robots 112 may include grabbers or arms that hold the containers 114. The robots 112 move between the stations 120 to move the containers 114 to the different stations 120.

The robots 116 hold and move the items 118 throughout the packing system 108. The robots 116 may include any suitable mechanism for holding the items 118. For example, the items 118 may be grocery items that are placed within boxes or crates. The robots 116 may be moving platforms that hold these boxes or crates by including a space for the boxes or crates to rest on the platforms. As another example, the robots 116 may include grabbers or arms that hold the boxes or crates. The robots 116 move to the different stations 120 according to instructions from the computing system 111 to move the items 118 to the different stations 120.

The stations 120 are areas that contain the robotic arms 122. For example, the stations 120 may be tables or platforms on which the robotic arms 122 are installed. When the robots 112 and 116 move to a station 120, the robots 112 and 116 position containers 114 and items 118 within range of the robotic arm 122 at the station 120. The robotic arm 122 picks up and moves items 118 within the range of the robotic arm 122 to containers 114 within the range of the robotic arm 122 according to instructions received from the computing system 111. For example, the robotic arm 122 may move the items 118 into a container 114 in a particular order based on instructions from the computing system 111. As another example, the robotic arm 122 may stop moving items 118 into a container 114 when the computing system 111 determines that the container 114 is full or that no more items should be moved into the container 114.

Generally, the computing system 111 coordinates the movements of the robots 112 and 116 to the different stations 120 to efficiently fulfill one or more received purchase orders, such as grocery orders. As the computing system 111 assigns items 118 to containers 114, the computing system 111 issues instructions to the robots 112 and 116 to move to particular stations 120. The computing system 111 also issues instructions to the robotic arms 122 at the stations 120 to pick up and move those items 118 to their assigned containers 114. The computing system 111 considers any suitable number of factors when assigning items 118 into containers 114. For example, the computing system 111 may consider the weight, frangibility, or volume of the items 118 when assigning and moving those items 118 into the containers 114. For example, the computing system 111 may assign items 118 to containers 114 so that lighter and more fragile items are placed on top of heavier and more durable items in the containers 114. Additionally, the computing system 111 may assign items 118 to containers 114 to reduce the amount of movement of the robots 112 and 116. For example, the computing system 111 may assign different items 118 to a container 114 based on whether the robots 116 holding those items 118 are positioned at the same station 120. Moreover, the computing system 111 may determine when no more items should be assigned to a container 114. For example, the computing system 111 may determine when a volume of the container 114 has been filled. As another example, the computing system 111 may determine that a fragile item 118 has been placed into a container 114 and that no other items will fit next to that item 118.

When the computing system 111 determines that a purchase order has been fulfilled, the computing system 111 issues instructions to the robots 112 holding the containers 114 with their respective items 118 to move to the storage and delivery system 110 so that the containers 114 may be organized for pickup or delivery. The storage and delivery system 110 includes containers 114 that hold items 118 of a fulfilled purchase order. The containers 114 may be organized in the storage and delivery system 110 for pickup or delivery. During pickup, a user 102 arrives at the storage and delivery system 110 and takes the containers 114 containing the items 118 purchased by the user 102. For delivery, the containers 114 are placed into delivery vehicles 126. The delivery vehicles 126 then deliver the containers 114 to users 102.

Figure 2A:
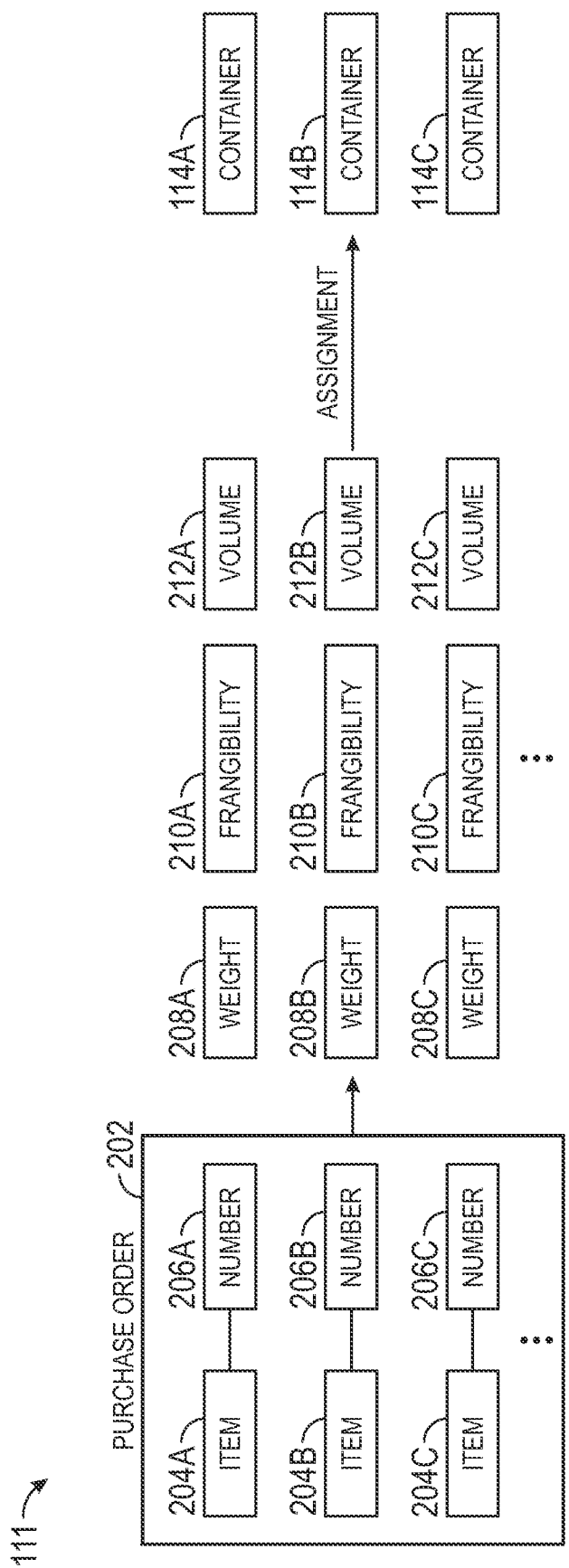
FIG. 2A illustrates an example computing system in the system of FIG. 1.

FIG. 2A illustrates an example computing system 111 in the system 100 of FIG. 1. Specifically, FIG. 2A illustrates the computing system 111 assigning items to containers. As discussed previously, the computing system 111 considers any suitable number of factors when assigning items to containers.

The computing system 111 receives a purchase order 202 from a device 104 shown in FIG. 1. The purchase order 202 includes a list of desired items 204. For example, the purchase order 202 may be a grocery order that includes a list of desired grocery items. Additionally, the purchase order 202 includes a number 206 for each item 204. The number 206 indicates a desired quantity of an item 204. As seen in FIG. 2A, the purchase order 202 includes an item 204A and a corresponding number 206A, an item 204B and a corresponding number 206B, and an item 204C and a corresponding number 206C. The purchase order 202 may include any suitable number of items 204.

The computing system 111 analyzes the items 204 and number 206 in the purchase order 202 to determine how the items 204 should be assigned to containers 114. In the example of FIG. 2A, the computing system 111 determines a weight 208, a frangibility 210, and a volume 212 for each item 204 in the purchase order 202. The computing system 111 may determine the weight 208, the frangibility 210, or the volume 212 using information retrieved from a database. For example, the database may store information about many different items 204. The computing system 111 communicates an identity of the items 204 in the purchase order 202 to the database to retrieve information about the item 204. In the example of FIG. 2A, the computing system 111 retrieves the weight 208, the frangibility 210, and the volume 212 of the items 204 in the purchase order 202. The item 204A has a weight 208A, a frangibility 210A, and a volume 212A. The item 24B has a weight 208B, a frangibility 210B, and a volume 212B. The item 204C has a weight 208C, a frangibility 210C, and a volume 212C.

The computing system 111 assigns the items 204 in the purchase order 202 to one or more containers 114 based on the information about the items 204 (e.g., the weight 208, the frangibility 210, and the volume 212). As shown in subsequent figures, the computing system 111 assigns the items 204 to containers 114 to reduce the chances of an item 204 being damaged while keeping the number of containers 114 used to a minimum.

Figure 2B:
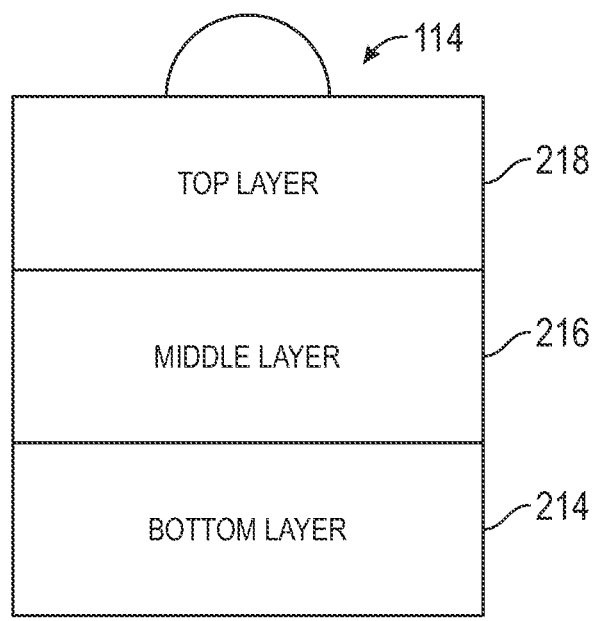
FIG. 2B illustrates an example container in the system of FIG. 1.

FIG. 2B illustrates an example container 114 in the system 100 of FIG. 1. The computing system 111 may divide each container 114 into a number of layers that are stacked on each other. As seen in the example of FIG. 2B, the computing system 111 divides the container 114 into a bottom layer 214, a middle layer 216, and a top layer 218. The bottom layer 214 is at the bottom of the container 114. The middle layer 216 is positioned on top of the bottom layer 214. The top layer 218 is positioned on top of the middle layer 216. The computing system 111 assigns items to the container 114 while tracking the items that are positioned in each layer.

Figure 2C:
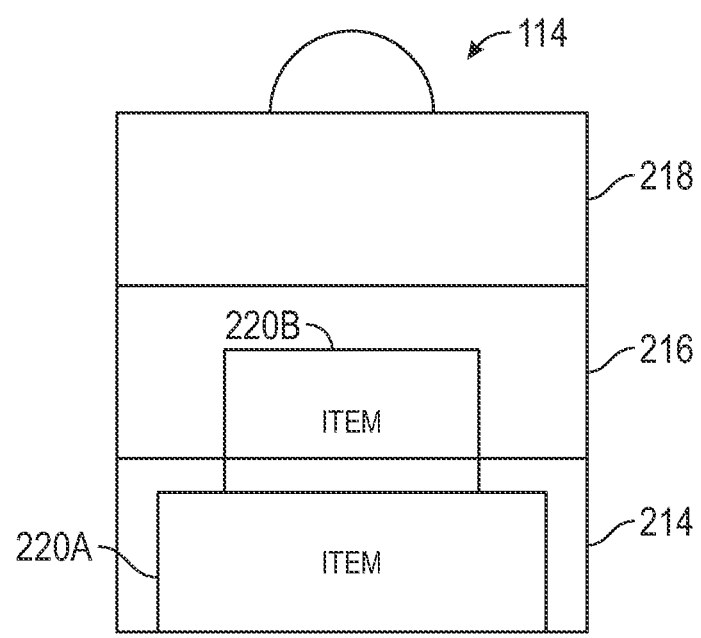
FIG. 2C illustrates an example container in the system of FIG. 1.

FIG. 2C illustrates an example container 114 in the system 100 of FIG. 1. As seen in FIG. 2C, the computing system 111 has assigned an item 220A and an item 220B to the container 114. The computing system 111 may have assigned the item 220A to the container 114 because the item 220A is the heaviest item in a purchase order. Thus, the item 220A is placed in the bottom layer 214. The computing system 111 then determines that the item 220B should be assigned to the container 114. As a result, the item 220B is placed in the middle layer 216 on top of the item 220A. The computing system 111 may determine that the frangibility of the item 220B is high, and in response, determine that no other items should be positioned on top of the item 220B. The computing system 111 may also determine, based on the volume of the item 220B, that no other items can be positioned next to the item 220B in the middle layer 216. As a result, the computing system 111 determines that no further items should be assigned to the container 114, and closes the container 114.

Figure 2D:
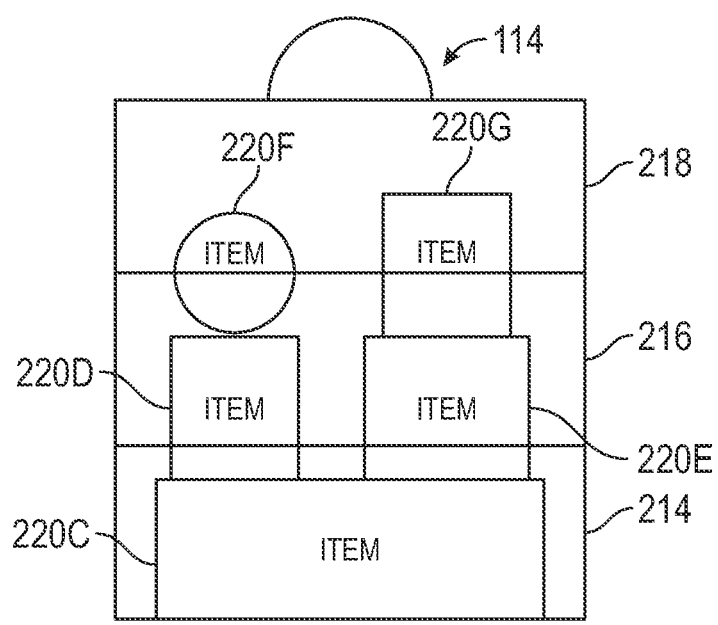
FIG. 2D illustrates an example container in the system of FIG. 1.

FIG. 2D illustrates an example container 114 in the system 100 of FIG. 1. The computing system 111 determines that an item 220C should be assigned first to the container 114, because the item 220C is the heaviest remaining item in a purchase order. As a result, the item 220C is positioned in the bottom layer 214 of the container 114. The computing system 111 then determines that an item 220D should be assigned to the container 114. As a result, the item 220D is positioned in the middle layer 216 on top of the item 220C. The computing system 111 may also determine, based on the volume of the item 220D, that an item 220E may be positioned next to the item 220D in the middle layer 216. In response, the computing system 111 assigns the item 220E to the container 114, and the item 220E is positioned in the middle layer 216 next to the item 220D. The computing system 111 may also determine, based on the frangibility of the items 220D and 220E, that items 220F and 220G may be positioned on top of the items 220D and 220E. In response, the computing system 111 assigns the items 220F and 220G to the container 114, and the items 220F and 220G are positioned in the top layer 218 on top of the items 220D and 220E. The computing system 111 may then determine that the fill volume of the container 114 has been reached and that no further items should be assigned to the container 114. In response, the computing system 111 closes the container 114.

Figure 3:
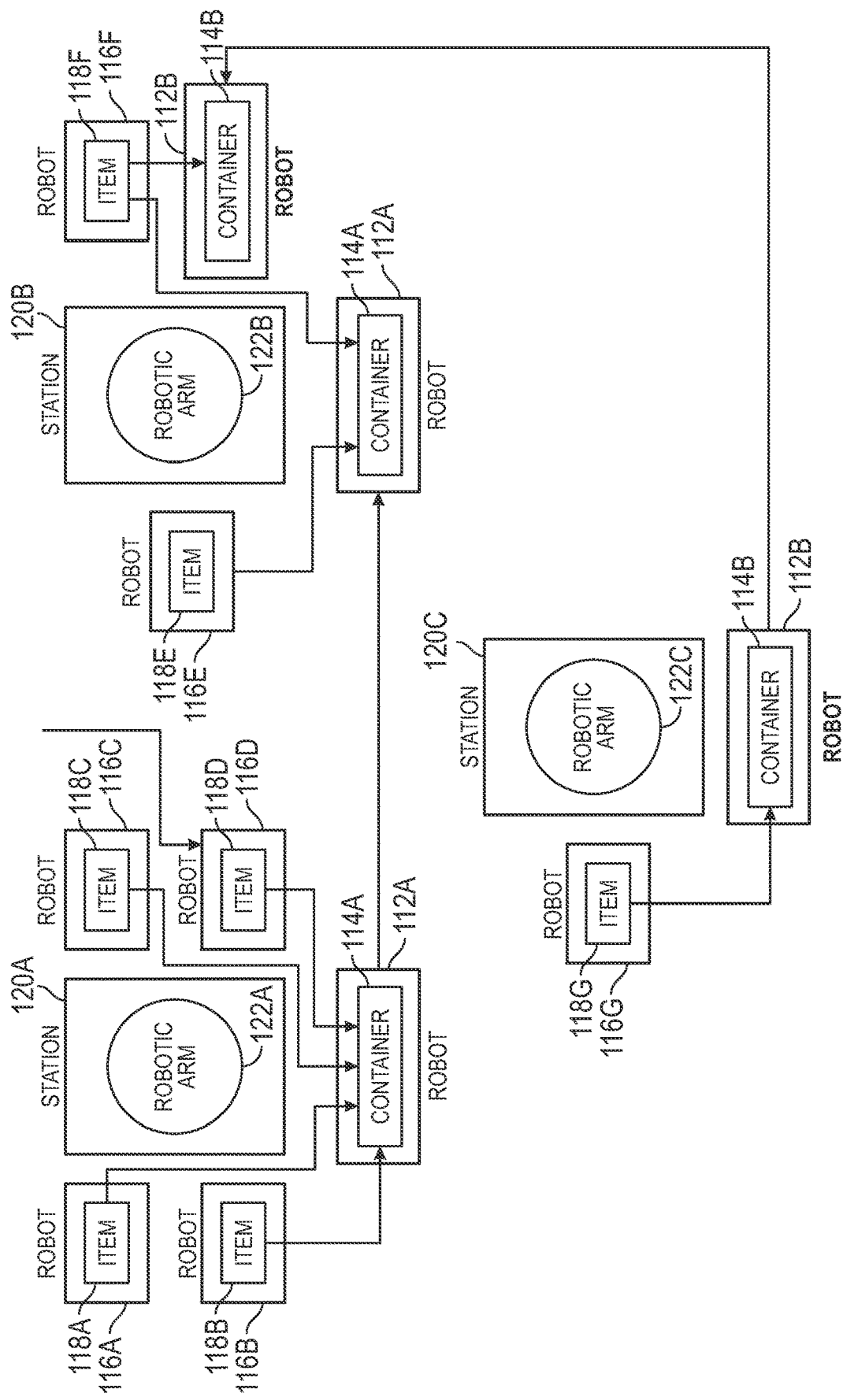
FIG. 3 illustrates an example packing system in the system of FIG. 1.

FIG. 3 illustrates an example packing system 108 in the system 100 of FIG. 1. As seen in FIG. 3, robots 112 and 116 move to different stations 120 so that robotic arms 122 at the station 120 can move items 118 into assigned containers 114. As discussed previously, the computing system 111 shown in FIG. 1 issues instructions to the robots 112 and 116 and the robotic arms 122 to coordinate the movement of the robots 112 and 116 and the robotic arms 122. Generally, the robots 112 and 116 move containers 114 and items 118 within range of the robotic arms 122. The robotic arms 122 then move items 118 into containers 114. When a container 114 is closed, the robot 112 holding that container 114 moves the container 114 to the storage and delivery system 110 for pickup and delivery.

In the example of FIG. 3, a robot 112A moves a container 114A to a station 120A with a robotic arm 122A. Additionally, robots 116A, 116B, and 116C move items 118A, 118B, and 118C to the station 120A. The robotic arm 122A then moves the items 118A, 118B, and 118C into the container 114A. While the robot 112A is at the station 120A, a robot 116D holding an item 118D may be moved to the station 120A so that the robotic arm 122A can move the item 118D into the container 114A. The robot 112A then moves the container 114A to the station 120B. Robots 116E and 116F have moved items 118E and 118F within range of the robotic arm 122B at the station 120B. The robotic arm 122B moves the items 118E and 118F into the container 114A. The container 114A may then be closed.

The packing system 108 may then begin packing a container 114B on a robot 112B. The container 114B may hold items from the same purchase order as the container 114A, or the container 114B may hold items for another purchase order. The robot 112B moves to the station 120C so that the robotic arm 122C at the station 120C can move an item 118G on a robot 116G into the container 114B. The robot 112B then moves to the station 120B. The robotic arm 122B moves the item 118F into the container 114B. The container 114B may then be closed.

In certain embodiments, the robots 116 are pre-positioned at the stations 120. As a result, the robots 112 holding containers 114, move to different stations 120, rather than the robots 116 holding items 118 moving to different stations 120. To reduce the time that the robots 112 spend traveling between stations 120, the containers 114 may be assigned items 118 that are positioned at the same station 120 so that the container 114 is packed with as many items 118 as possible from the same station 120 when the container 114 is positioned at that station 120. Using the example of FIG. 3, the items 118B and 118C may be assigned to the container 114A because the items 118B and 118C are located at the same station 120A as the item 118A.

Figure 4A:
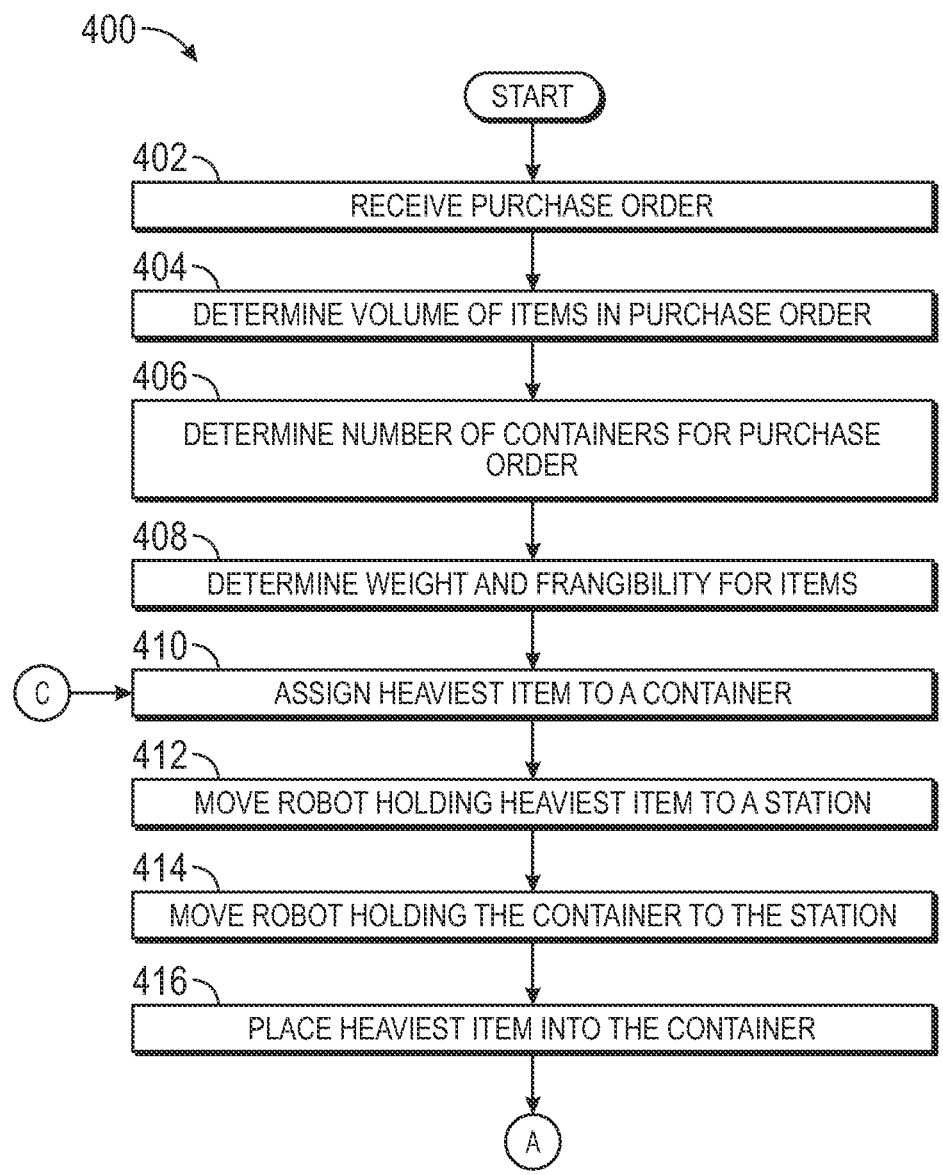
FIGS. 4A, 4B, 4C, and 4D illustrate an example method performed in the system of FIG. 1.
Figure 4B:
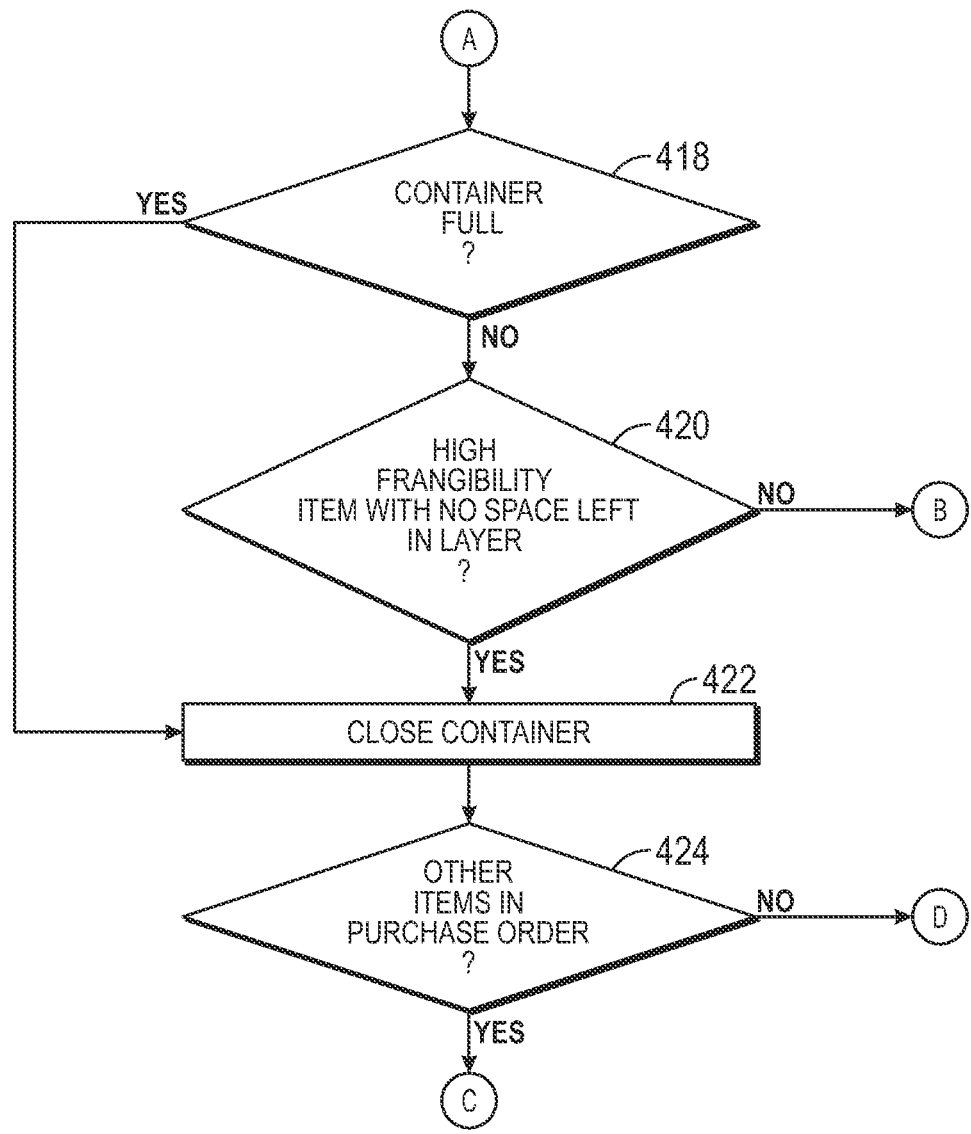
Figure 4C:
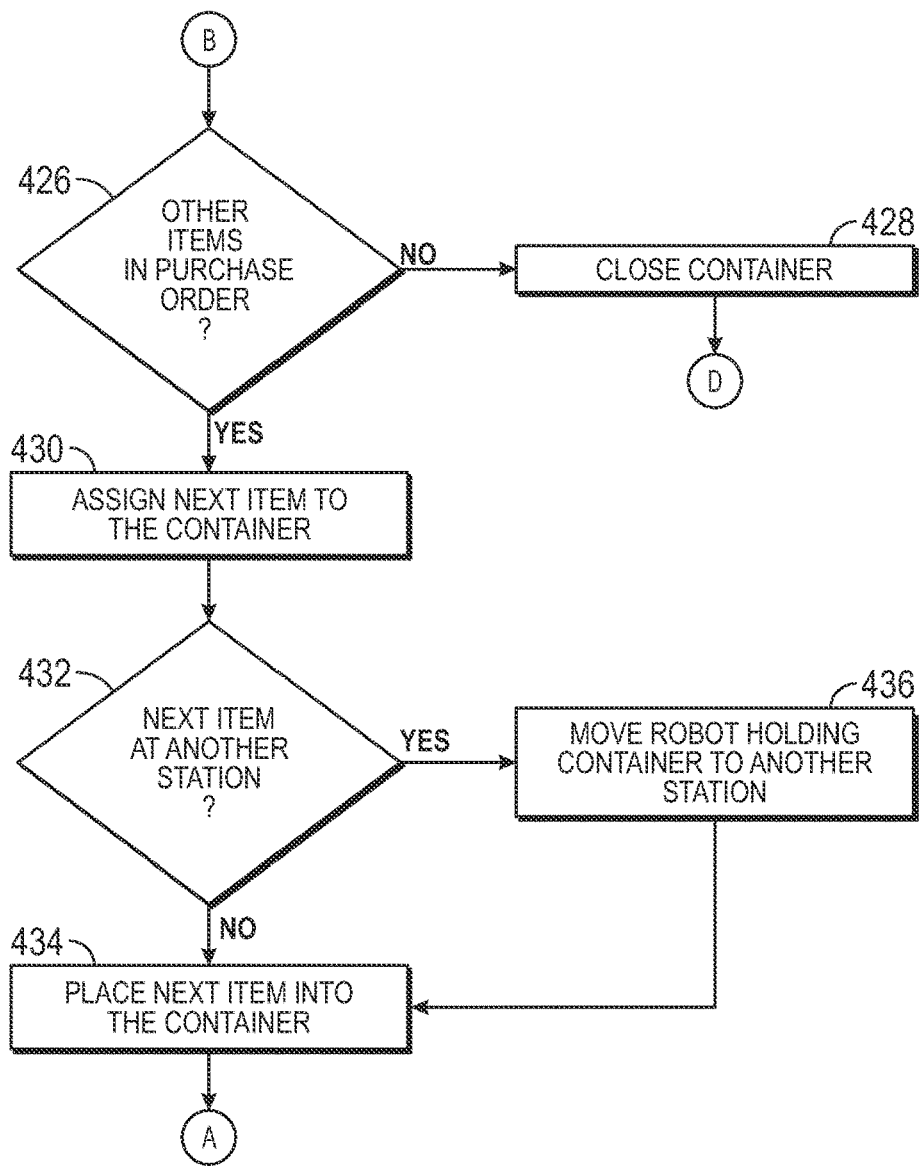

FIGS. 4A, 4B, and 4C illustrate an example method 400 performed in the system 100 of FIG. 1. In particular embodiments, the computing system 111 performs the method 400. By performing the method 400, the computing system 111 improves the efficiency of purchase order fulfillment and reduces the time that it takes to fulfill a purchase order.

In block 402, the computing system 111 receives a purchase order 202. The purchase order 202 may have been communicated by a device 104. The purchase order 202 may be a grocery order that includes a list of desired items 204 and a desired quantity for each item 204. The computing system 111 determines certain characteristics about the items 204 in the purchase order 202 to determine how the items 204 should be assigned to containers 114.

In block 404, the computing system 111 determines the volume of the items 204 in the purchase order 202. The computing system 111 may retrieve the volumes 212 of the items 204 from a database. The computing system 111 may sum these volumes 212 to determine a total volume for the purchase order 202. In block 406, the computing system 111 determines a number of containers 114 for the purchase order 202. The computing system 111 may determine the number of containers 114 needed for the purchase order 202 by dividing the total volume of the items 204 determined in block 404 by the volume of a container 114.

In block 408, the computing system 111 determines a weight 208 and a frangibility 210 for each item 204 in the purchase order 202. The computing system 111 may retrieve the weights 208 and frangibilities 210 from the database that stores information about the items 204. The computing system 111 then uses this information to assign the items 204 to containers 114.

In block 410, the computing system 111 assigns a heaviest item 204 to a container 114. In this manner, the heaviest item 204 is placed at the bottom of the container 114. After assigning the heaviest item 204 to the container 114, the computing system 111 moves a robot 116 holding the heaviest item 204 to a station 120 so that the heaviest item 204 is within range of a robotic arm 122 at the station 120. The computing system 111 may move the robot 116 by issuing an instruction to the robot 116 to move to the station 120. In response, the robot 116 moves the heaviest item 204 to the station 120. The computing system 111 also moves a robot 112 holding the container 114 to the station 120. The computing system 111 may issue an instruction to the robot 112, and in response, the robot 112 moves to the station 120 so that the container 114 is within range of the robotic arm 122 at the station 120. The robotic arm 122 at the station 120 then places the heaviest item 204 into the container 114. In certain embodiments, the computing system 111 issues an instruction to the robotic arm 122, and in response, the robotic arm 122 moves the heaviest item 204 into the container 114.

After the item 204 is moved into the container 114, the computing system 111 proceeds to the process shown in FIG. 4B to determine whether more items may be assigned to the container 114. In block 418, the computing system 111 determines whether the container 114 is full. Specifically, the computing system 111 determines whether a fill volume of the container 114 has been reached. For example, the computing system 111 may determine the total volume of the items 204 currently assigned to the container 114. The computing system 111 then determines a difference between the total volume of the items 204 assigned to the container 114 and the fill volume of the container 114. The computing system 111 then determines whether there is an item 204 remaining in the purchase order 202 with a volume that is smaller than the difference. If there is no such item 204, then the computing system 111 determines that the container 114 is full, and proceeds to block 422 to close the container 114. If there is such an item 204 remaining in the purchase order 202, then the computing system 111 performs other checks to determine whether that item may be assigned to the container 114.

In block 420, the computing system 111 determines whether a high frangibility item 204 has been assigned to the container 114, and, if so, whether there is space left in the same layer of the container 114 as the high frangibility item 204. Stated differently, the computing system 111 determines whether a high frangibility item 204 has been assigned to the container 114 and whether another item 204 may be placed into the container 114 without being placed on top of the high frangibility item 204. If there is a high frangibility item 204 in the container 114 and there is no space left in the same layer as the high frangibility item 204, then the computing system 111 proceeds to block 422 to close the container 114. If there is no high frangibility item in the container 114 or if there is a high frangibility item 204 in the container 114 and there is space left in the same layer as the high frangibility item 204, then the computing system 111 proceeds to the process shown in FIG. 4C.

After closing the container 114 in block 422, the computing system 111 determines whether there are other items 204 remaining in the purchase order 202 in block 424. If there are items 204 remaining to be fulfilled, the computing system 111 opens a new container 114 and returns to block 410 in FIG. 4A to assign items 204 from the remaining items 204 in the purchase order 202 to the new container 114. If there are no other items remaining to be fulfilled in the purchase order 202, then the computing system 111 proceeds to the process shown in FIG. 4D.

If the computing system 111 determines in blocks 418 and 420 that additional items 204 may be assigned to the container 114, the computing system 111 performs the process shown in FIG. 4C to assign additional items to the container 114. In block 426, the computing system 111 determines whether there are other items 204 remaining for fulfillment in the purchase order 202. If there are no other items 204 remaining for fulfillment, then the computing system 111 proceeds to block 428 to close the container 114. The computing system 111 then performs the process shown in FIG. 4D.

If there are other items 204 remaining for fulfillment in the purchase order 202, the computing system 111 assigns the next item to the container 114 in block 430. The computing system 111 may determine the next item to be assigned to the container 114 using any number of factors. For example, the computing system 111 may determine the item 204 as another item 204 positioned at the same station 120 as the robot 112 holding the container 114. As another example, the computing system 111 may determine the next item 204, based on the size and shape of the items 204 in the container 114. The computing system 111 may select an item 204 that has a similar shape, size, or weight as an item 204 that was previously placed into the container 114. In this manner, similar items are placed into the same container 114.

In block 432, the computing system 111 determines whether the next item 204 is at another station 120 as the robot 112 holding the container 114. If the next item 204 is at the same station 120 as the robot 112 holding the container 114, the computing system 111 places the next item 204 into the container 114 (e.g., by instructing the robotic arm 122 at the station 120 to place the next item 204 into the container 114) in block 434. If the next item 204 is at another station 120, the computing system 111 moves the robot 112 holding the container 114 to the other station 120 (e.g., by instructing the robot 112 to move to the other station 120) in block 436. After the robot 112 moves to the other station 120, the computing system 111 places the next item 204 into the container 114 (e.g., by instructing the robotic arm 122 at the other station 120 to place the next item 204 into the container 114) in block 434.

The computing system 111 may place the next item 204 into the container 114 in block 434 in any suitable manner. For example, the computing system 111 may issue a command to a robotic arm 122 to place the next item into the container 114. In response, the robotic arm 122 places the next item 204 into the container 114. In some embodiments, the computing system 111 moves the robot 112 holding the container 114 to another station 120 with another robotic arm 122 so that the next item 204 may be placed into the container 114. In some embodiments, a robot 116 holding the next item 204 is moved to the station 120 with the container 114 so that the robotic arm 122 at that station 120 can move the next item 204 into the container 114. After the next item 204 is placed into the container 114, the computing system 111 performs the process shown in FIG. 4B to determine if the container 114 is full.

Figure 4D:
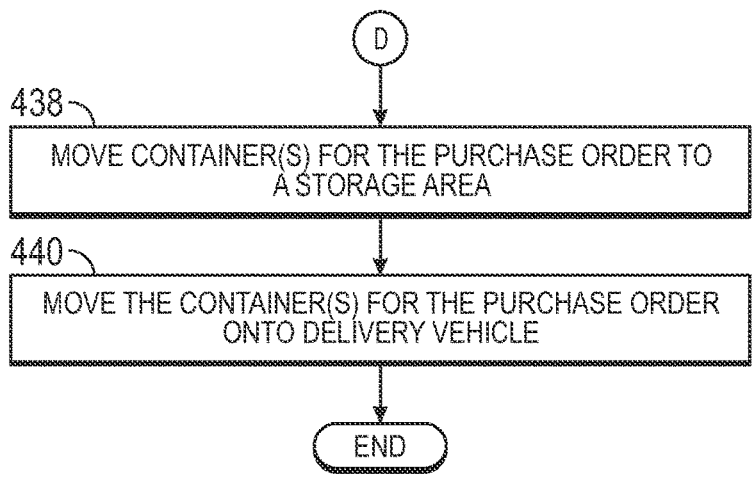

If the computing system 111 determines that there are no other items 204 remaining for fulfillment in the purchase order 202, the computing system 111 performs the process shown in FIG. 4D to close the purchase order 202. In block 438, the computing system 111 moves one or more containers 114 for the purchase order 202 to a storage and delivery system 110. The computing system 111 may issue instructions to robots 112 holding the one or more containers 114. In response, the robots 112 move the one or more containers 114 to the storage and delivery system 110. The containers 114 may then be organized for pickup. If the containers 114 should be arranged for delivery, then in block 440, the containers 114 for the purchase order 202 are moved onto a delivery vehicle 126. The delivery vehicle 126 then delivers the containers 114 to a user 102 that made the purchase order 202.

Figure 5:
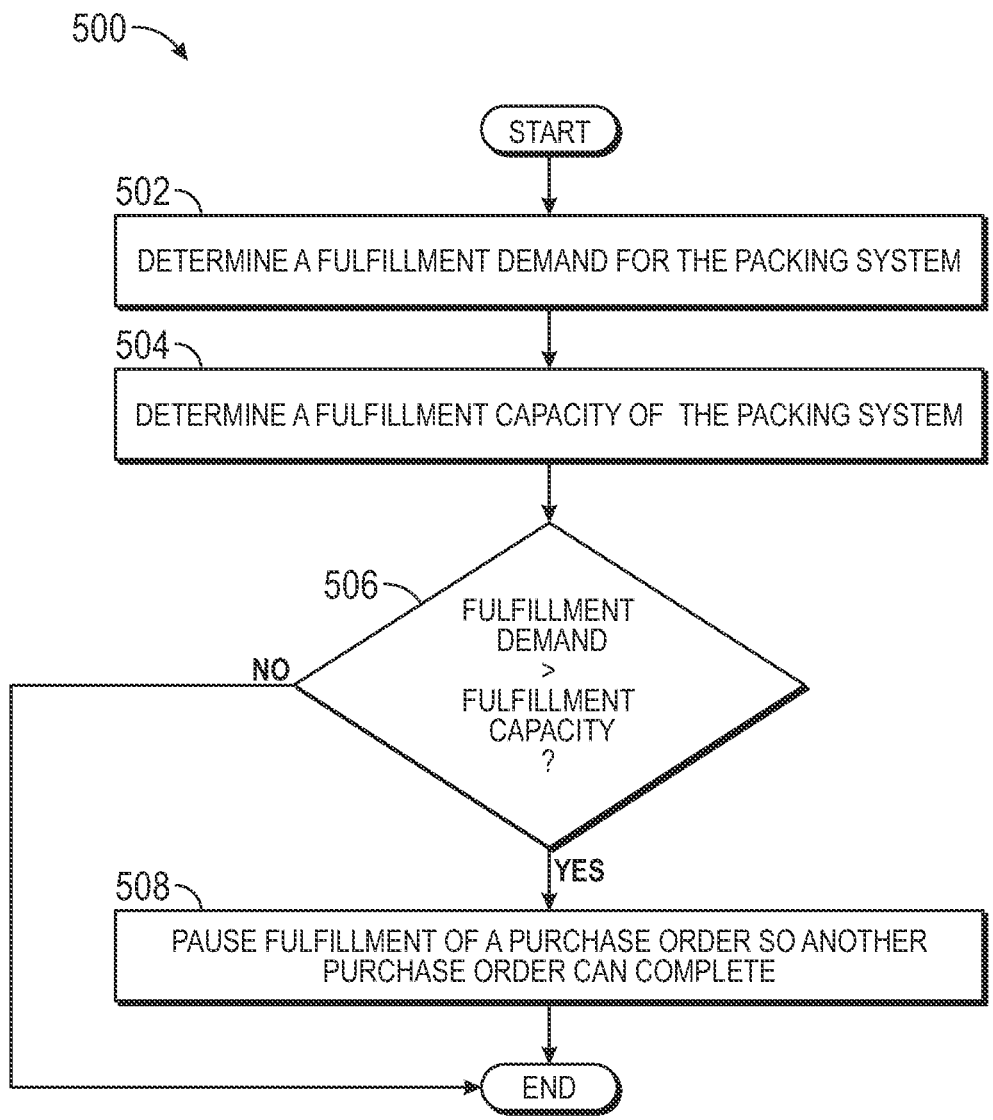
FIG. 5 illustrates an example method performed in the system of FIG. 1.

FIG. 5 illustrates an example method 500 performed in the system 100 of FIG. 1. In particular embodiments, the computing system 111 performs the method 500. By performing the method 500, the computing system 111 implements a prioritization when demand on the packing system 108 is high.

In block 502, the computing system 111 determines a fulfillment demand for the packing system 108. For example, the computing system 111 may determine a number of purchase orders 202 pending in the packing system 108. As another example, the computing system 111 may determine a total number of items 204 in purchase orders 202 pending in the packing system 108. The computing system 111 may also determine any time requirements set for the pending purchase orders 202. For example, the computing system 111 may determine an amount of time before each purchase order 202 needs to be fulfilled.

In block 504, the computing system 111 determines a fulfillment capacity of the packing system 108. For example, the computing system 111 may determine a total number of items 204 that the robotic arms 122 in the packing system 108 may move during a period of time. This period of time may be the amount of time before the pending purchase orders 202 need to be fulfilled. As another example, the computing system 111 may determine an amount of time needed for the packing system 108 to fulfill the pending purchase orders 202.

In block 506, the computing system 111 determines whether the fulfillment demand exceeds the fulfillment capacity. For example, the computing system 111 may determine that the amount of time needed for the packing system 108 to fulfill the pending purchase orders 202 exceeds the amount of time available before the pending purchase orders 202 need to be fulfilled. If the fulfillment demand does not exceed the fulfillment capacity, then the computing system 111 ends the method 500. If the fulfillment demand exceeds the fulfillment capacity, then the computing system 111 begins prioritizing the pending purchase orders 202. In block 508, the computing system 111 pauses fulfillment of a purchase order 202 so that another purchase order 202 can complete. In certain embodiments, the computing system 111 attempts to minimize the number of incomplete purchase orders 202 that are being packed by the robotic arms 122 when fulfillment demand exceeds fulfillment capacity. As a result, the packing system 108 pauses certain purchase orders 202 so that nearly complete purchase orders 202 may be packed and moved to the storage and delivery system 110.

In summary, a robotic purchase order fulfillment system 100 uses robots to pack containers 114 (e.g., bags) with a customer's desired items 118 (e.g., grocery items). The system 100 includes a set of robots 116 that hold items 118, a set of robots 112 that hold containers 114, and stations 120 that have robotic arms 122. When a customer sends a purchase order to the system 100, the system 100 coordinates the movement of the first set of robots 116 and the second set of robots 112 between the stations 120. For example, the system 100 may determine the items 118 to be packed into a container 114 and then move the robots 116 holding those items 118 and the robot 112 holding the container 114 to a station 120. The robotic arm 122 at that station 120 then moves the items 118 into the container 114. When the system 100 determines that the container 114 is full or that no further items 118 should be placed in the container 114, the container 114 is closed. The system 100 starts packing another container 114 if there are items 118 remaining in the purchase order. After the items 118 in the purchase order have been moved into containers 114, the robots 112 holding those containers 114 move the containers 114 to a staging area where the containers are arranged for pickup or delivery. As a result, the robotic purchase order fulfillment system 100 efficiently and quickly fulfills purchase orders.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

While the foregoing is directed to embodiments of the present invention, other and further embodiments of the invention may be devised without departing from the basic scope thereof, and the scope thereof is determined by the claims that follow.

What is claimed is:

1. A method for coordinating movement of robots in a grocery fulfillment system, the method comprising:
    assigning a heaviest item in a grocery order to a container;
    moving a first robot holding the container to a station comprising a robotic arm such that the container is within a range of the robotic arm;
    moving a second robot holding the heaviest item to the station such that the heaviest item is within the range of the robotic arm;
    moving, by the robotic arm, the heaviest item from the second robot into the container;
    assigning a second item in the grocery order to the container;
    moving a third robot holding the second item to the station such that the second item is within the range of the robotic arm; and
    after the robotic arm has placed the second item into the container and in response to determining that no further items should be assigned to the container based on a frangibility of the second item, moving the first robot holding the container to a staging area for delivery of the container.

2. The method of claim 1, further comprising:
    assigning a third item in the grocery order to a second container;
    moving a fourth robot holding the second container to the station such that the second container is within the range of the robotic arm;
    moving a fifth robot holding the third item to the station such that the third item is within the range of the robotic arm;
    after the robotic arm has placed the third item into the second container, assigning a fourth item in the grocery order to the second container;
    moving the fourth robot to a second station comprising a second robotic arm such that the second container is within a range of the second robotic arm;
    moving a sixth robot holding the fourth item to the second station such that the fourth item is within the range of the second robotic arm; and
    after the second robotic arm has placed the fourth item into the second container and in response to determining that no further items should be assigned to the second container, moving the fourth robot to the staging area for delivery of the second container.

3. The method of claim 2, wherein determining that no further items should be assigned to the second container is based on determining a fill volume of the second container has been reached by the third and fourth items.

4. The method of claim 1, further comprising filling remaining containers for the grocery order and pausing another grocery order in response to determining that a fulfillment demand exceeds a fulfillment capacity.

5. A method, comprising:
assigning items in a received purchase order to containers based on weights of the items, wherein a heaviest item assigned to a first container is placed into the first container before other items assigned to the first container are placed into the first container;
coordinating movement of a first set of robots holding the containers and movement of a second set of robots holding the items to a set of stations comprising robotic arms;
using the robotic arms to place the items into the containers; and
determining that no other items should be placed into the first container based on a frangibility of the second item;
wherein a second item is placed into the first container after placing the heaviest item into the first container, and wherein the second item is assigned to the first container based on a determination that a robot of the second set of robots holding the second item is located at a same station of the set of stations as a robot of the second set of robots holding the heaviest item.

6. The method of claim 5, further comprising determining that no other items should be placed into the first container in response to determining that a fill volume of the first container has been reached.

7. The method of claim 5, further comprising pausing another purchase order in response to determining that a fulfillment demand of the robotic arms exceeds a fulfillment capacity of the robotic arms.

8. The method of claim 5, further comprising determining a number of the containers based on a total volume of the items in the received purchase order.

9. The method of claim 5, wherein the received purchase order is a grocery order.

10. A system, comprising:
a first set of robots holding containers;
a second set of robots holding items;
a set of stations comprising robotic arms; and
a controller comprising memory and a hardware processor communicatively coupled to the hardware processor, the hardware processor configured to:
assign items in a received purchase order to the containers;
coordinate movement of the first set of robots and movement of the second set of robots to the set of stations, wherein the robotic arms place the items into the containers; and
pause another purchase order in response to determining that a fulfillment demand of the robotic arms exceeds a fulfillment capacity of the robotic arms.

11. The system of claim 10, wherein assigning the items to containers is based on weights of the items, and wherein one or more of the robotic arms place a heaviest item assigned to a first container into the first container before other items assigned to the first container are placed into the first container.

12. The system of claim 11, wherein the one or more robotic arms place a second item into the first container after the heaviest item is placed into the first container, and wherein the hardware processor is further configured to determine that no other items should be placed into the first container based on a frangibility of the second item.

13. The system of claim 12, wherein the second item is assigned to the first container based on a determination that a robot of the second set of robots holding the second item is located at a same station of the set of stations as a robot of the second set of robots holding the heaviest item.

14. The system of claim 11, wherein the hardware processor is further configured to determine that no other items should be placed into the first container in response to determining that a fill volume of the first container has been reached.

15. The system of claim 10, wherein the hardware processor is further configured to determine a number of the containers based on a total volume of the items in the received purchase order.

16. The system of claim 10, wherein the received purchase order is a grocery order.

* * * * *